UNITED STATES PATENT OFFICE.

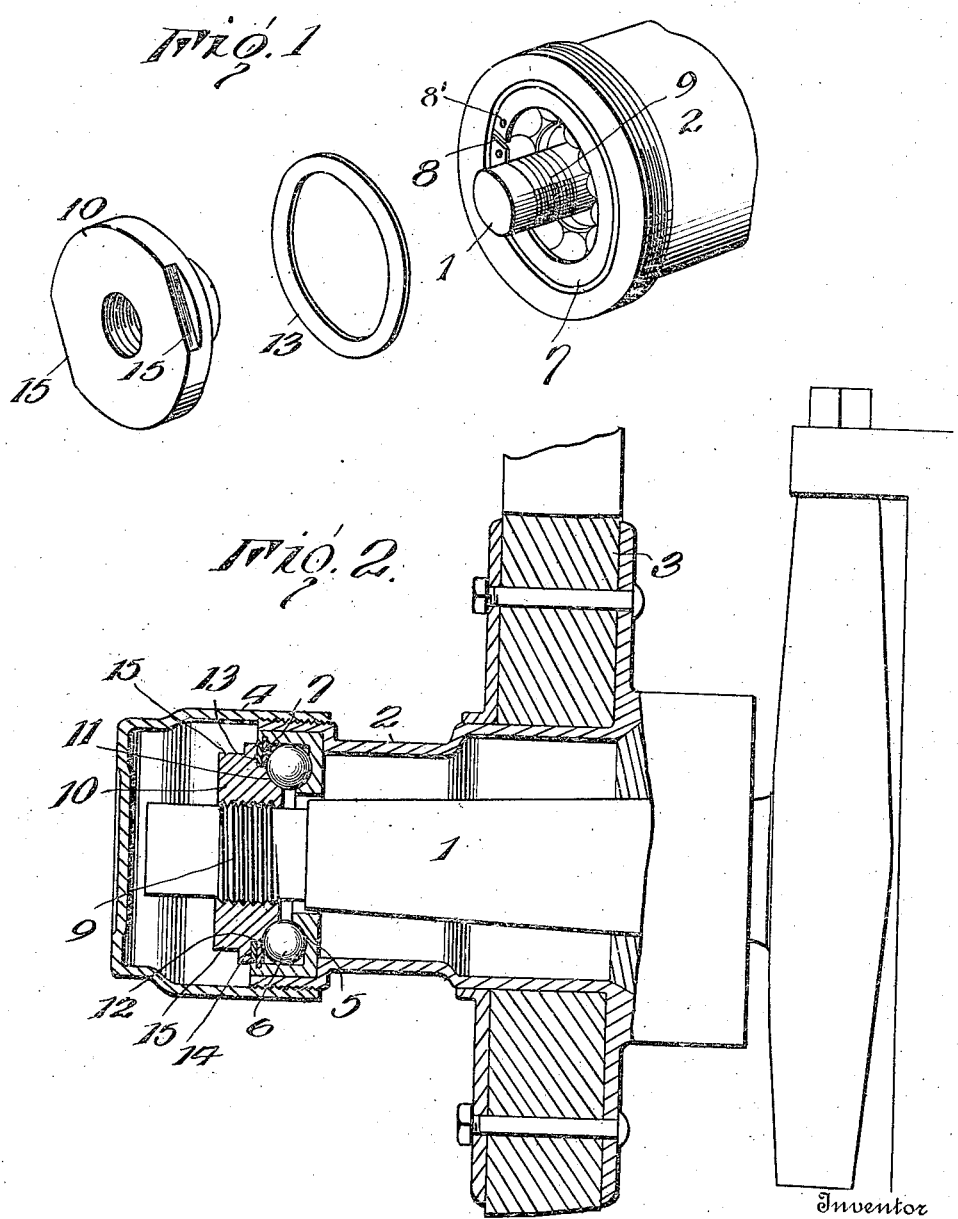

CHARLES N. FRAUHAM, OF WALLINGFORD, CONNECTICUT.

BEARING FOR AUTOMOBILE-HUBS.

1,243,929.   Specification of Letters Patent.   Patented Oct. 23, 1917.

Application filed August 8, 1916. Serial No. 113,765.

*To all whom it may concern:*

Be it known that I, CHARLES N. FRAUHAM, a citizen of the United States, residing at Wallingford, in the county of New Haven and State of Connecticut, have invented certain new and useful Improvements in Bearings for Automobile-Hubs, of which the following is a specification.

This invention relates to bearings for automobile wheels and seeks to provide a simple, inexpensive and efficient device whereby in the event of any of the bearing balls being broken they will be retained in place and prevented from dropping so as to bind and prevent the free rotation of the wheel.

The object of the invention is obtained in the use of such a device as is illustrated in the accompanying drawings and resides in certain novel features which will be particularly pointed out in the claims following a detailed description.

In the drawings:

Figure 1 is a perspective view of the retaining ring and the adjusting cone in perspective and disassembled but in their proper positions relative to the ball bearing;

Fig. 2 is an enlarged longitudinal section through the hub showing my improvements applied thereto.

In the drawings the reference numeral 1 indicates the spindle and 2 designates the hub to which the spokes 3 are secured. The hub is mounted at its inner end in any convenient or preferred manner to rotate about the spindle and carries at its outer end a dust cap 4 of the usual form which excludes dust and dirt from the outer end of the spindle and the bearing interposed between the same and the outer end of the hub. Within the outer end of the hub is secured the race ring or cup 5 within which are a plurality of balls 6 adapted to rotate freely within the cup and upon the outer raceway which is provided by the same. In the longitudinal wall of the cup near the outer end of the same is an annular groove which is adapted to receive the outer edge of a ball retaining ring 7 which is preferably split as shown at 8 and formed near its ends with openings 8' whereby it may be engaged by a suitable tool and contracted so as to be removed from or inserted in the end of the cup. When the tool is withdrawn from the retainer, the retainer will expand so as to fit snugly in the said groove and will be thereby held in place so as to project partly across the series of balls and retain them in the cup. The outer extremity of the spindle is threaded as shown at 9 to receive the cone and adjusting nut 10 which is threaded onto the said threaded portion and has a cone bearing or race formed upon its inner extremity as shown at 11 to enter between the annular series of balls 6 and fit against the same so that the proper engagement between the balls and the spindle will be provided. Immediately adjacent the conical tapered portion of this bearing nut is an annular longitudinal shoulder 12 which fits within the retainer 7 and also passes through and supports a wear ring 13 which fits against the retainer 7 and has its outer face flush with the outer end edge of the ball cup 5. At the end of the longitudinal shoulder 12 an annular radial shoulder 14 is formed upon the adjusting nut and this radial shoulder 14 bears against the outer face of the ring 13 as clearly shown. At its outer end the adjusting nut is provided with flattened portions 15 adapted to be engaged by a wrench or other tool so that it may be readily turned home.

It is thought that the manner of assembling the bearing will be readily understood from the foregoing description taken in connection with the accompanying drawings. The ball cup with the balls and the retainer 7 are fitted within the end of the hub in the usual manner and after the hub has been placed in position upon the spindle the ring 13 is placed against the retainer 7 after which the adjusting nut and cone is engaged over the end of the spindle and turned home so as to bear upon the balls as shown in Fig. 2.

Should the retainer 7 spring out of place or one of the balls 6 be broken the holding ring 13 and the adjusting cone and nut will positively prevent loss of the parts and will hold them in the operative position so that the wheel will continue to rotate freely until the vehicle reaches a place where proper repairs can be made. Serious accidents have heretofore been occasioned by the breaking of one or more balls and the subsequent dropping of the same so that the parts would become locked and the wheel refuse to rotate. By the use of my device such accidents will be prevented and the wheel will continue to rotate freely even though several balls should split.

The ring 13, is continuous, as shown clearly in Fig. 1, and is carried by the adjusting nut or cone. When in position, as shown clearly in Fig. 2, the outer face or side of the ring is flush with the end of the cup so that if any dust should work into the dust cap 4, it will be prevented from working into the bearing and causing undue wear therein. The escape of lubricant from the hub will also be prevented. This ring 13 is free to rotate with the cone or adjusting cup and if the split retainer 7 should become broken or should work out of the groove in the hub in which it is seated, the holding ring 13 will prevent the retaining ring leaving the bearing and, consequently, the balls will be positively retained in their proper working location even if some of them should be split or the retainer 7 should be broken or work loose.

Having thus described the invention, what is claimed as new is:

1. The combination with a hub, and a spindle, of a cup mounted within the hub around the spindle, a plurality of balls mounted in the cup, a split retainer sprung into an annular groove in the end of the cup to engage against and retain the balls, the retainer near its ends having tool receiving openings to facilitate its removal, an adjusting cone mounted upon the spindle to rotate therewith and having its inner end constructed to engage said balls, said cone being further constructed to pass through the said retainer, and a holding ring interposed between the cone and the said retainer and carried and held against the retainer by the cone.

2. The combination with a hub, and a spindle, of a cup secured within the end of the hub around the spindle, a plurality of balls fitted in and rotating in the cup, a split retainer ring frictionally held in the cup near the outer end thereof and extending partly over the balls, a cone fitted upon the spindle to rotate therewith and having a tapered inner end portion to engage the balls and constructed adjacent said tapered portion with an annular longitudinal shoulder extending through the split retainer and an annular radial shoulder at the outer end of the said longitudinal shoulder, and a holding ring fitting around and carried by said annular shoulder and held against the split retainer by the annular radial shoulder of the cone, the holding ring being free to turn relative to both the retainer and cone whereby to relieve wear between them.

In testimony whereof I affix my signature.

CHARLES N. FRAUHAM. [L. s.]

Copies of this patent may be obtained for five cents each, by addressing the "Commissioner of Patents, Washington, D. C."